United States Patent [19]
McManus et al.

[11] Patent Number: 5,479,186
[45] Date of Patent: Dec. 26, 1995

[54] VIDEO MONITOR COLOR CONTROL SYSTEM

[75] Inventors: Paul A. McManus, Sherwood; Robert J. Beaton, Beaverton, both of Oreg.

[73] Assignee: Tektronix, Inc., Wilsonville, Oreg.

[21] Appl. No.: 653,741

[22] Filed: Feb. 11, 1991

Related U.S. Application Data

[63] Continuation of Ser. No. 368,108, Jun. 19, 1989, abandoned, which is a continuation of Ser. No. 113,022, Oct. 26, 1987, Pat. No. 4,875,032.

[51] Int. Cl.$^6$ ............................................. G09G 1/00
[52] U.S. Cl. ........................ 345/11; 345/153; 345/199
[58] Field of Search ................................ 340/701, 703, 340/793, 811; 358/75, 76, 78, 80, 10, 139; 395/128, 129; 345/150, 153, 154, 199, 11

[56] References Cited

U.S. PATENT DOCUMENTS

| | | | |
|---|---|---|---|
| 3,962,722 | 6/1976 | Ciciora | 358/10 |
| 3,984,862 | 10/1976 | Volz | 358/139 |
| 4,379,292 | 4/1983 | Minato et al. | 340/703 |
| 4,386,345 | 5/1983 | Narveson et al. | 340/703 |
| 4,409,614 | 10/1983 | Eichler et al. | 358/80 |
| 4,415,921 | 11/1983 | Mulvanny et al. | 358/139 |
| 4,439,735 | 3/1984 | Alvite et al. | 358/10 |
| 4,485,394 | 11/1984 | Ghaem-Maghami et al. | 358/139 |
| 4,500,919 | 2/1985 | Schreiber | 358/80 |
| 4,593,308 | 6/1986 | Kemplin | 358/139 |
| 4,607,288 | 8/1986 | Freyberger | 358/10 |
| 4,700,218 | 10/1987 | Thomsen et al. | 358/10 |
| 4,706,108 | 11/1987 | Kumagai et al. | 358/10 |
| 4,843,573 | 6/1989 | Taylor et al. | 340/701 |
| 4,875,032 | 10/1989 | McManus et al. | 340/703 |

*Primary Examiner*—Richard Hjerpe
*Attorney, Agent, or Firm*—Patrick W. Hughey; Alan K. Aldous; Richard B. Preiss

[57] ABSTRACT

A video monitor color control system including means for calibrating the intensity response of CRT phosphor sets to each of a plurality of electron gun control levels. Provided is a processor (24) that generates a sequence of discrete DAC signals, each DAC signal identifying an electron gun and a DAC value for driving the electron gun at a selected control level. Also provided is a monitor driver (22) connected to the processor (24) and to the monitor (20) and controllable in response to a DAC signal for driving the electron gun identified by the DAC signal at the control level identified by the DAC signal. The driven electron gun excites the associated phosphor set. A sensor (28) is provided for detecting the luminous intensity level of the phosphor excited by the electron gun, and for converting the detected intensity into a representative signal. The processor (24) receives for each discrete DAC signal the representative signals produced by the sensor and generates a look-up table for each gun defining intensity levels for each of the plurality of electron gun control levels.

17 Claims, 3 Drawing Sheets

# VIDEO MONITOR COLOR CONTROL SYSTEM

This is a continuation of application Ser. No. 07/368,108, filed Jun. 19, 1989, now abandoned, which is a continuation of application Ser. No. 07/113,022, filed Oct. 26, 1987, which issued Oct. 17, 1989 as U.S. Pat. No. 4,875,032.

TECHNICAL FIELD

This invention pertains to a system for accurately controlling video monitor color characteristics.

BACKGROUND INFORMATION

Video monitors comprising cathode-ray tubes (CRT's) are widely used display devices. Color CRT displays are especially useful means for conveying graphic information. Generally, a color CRT display includes three electron guns, each gun controllable to excite an associated red, green or blue phosphor set carried on the CRT screen. In some applications, such as graphic arts, advertising, textile design, etc., color CRT displays are relied upon to display colors having specific colorimetric parameters, so that the identical color can be reproduced with other media (paints, inks, dyes, etc.) using those same colorimetric parameters. Such parameters may be the well-known XYZ tristimulus values as defined by the International Commission on Illumination or CIE.

Disclosed in a copending patent application of Murch, et al., entitled, "Display-Based Color System", is a useful system for organizing colors into a perceptually uniform color space having coordinates that are related to the CIE tristimulus values XYZ. Also disclosed is a method for transforming a point in that color space (as defined by the color space coordinates) into suitable notation for displaying that point (i.e., color) on a CRT display. To this end, the point is transformed into a corresponding rgb intensity vector. An rgb intensity vector is a 3-element vector denoting the relative intensity contribution of each CRT phosphor set required for displaying a selected color. To display a color represented by an rgb intensity vector, it is necessary to convert the rgb intensity vector into associated "DAC values." DAC values are scaled numerical values (usually ranging from 0–255) corresponding to the electron gun control levels required to drive the associated phosphor set at various luminous intensities.

In order to utilize rgb intensity vectors, or for otherwise producing colorimetrically accurate displays, the CRT display must be calibrated. That is, the DAC-value/phosphor intensity relationship must be precisely determined.

SUMMARY OF THE INVENTION

This invention is directed in part to a system for calibrating the intensity response of CRT monitor phosphor sets to each of a plurality of electron gun control levels. Specifically provided is a processor that generates a sequence of discrete DAC signals. Each DAC signal identifies an electron gun and a DAC value for driving the electron gun at a selected control level. Also provided is a monitor driver that is connected to the processor and to the monitor and is controllable, in response to a DAC signal, for driving the electron gun identified by the DAC signal at the control level that is identified by the DAC signal. The driven electron gun excites an associated phosphor set. A sensor is provided for detecting the luminous intensity level of the phosphor set excited by the electron gun, and for converting the detected intensity into a representative signal. The processor receives the representative signal produced by the sensor and stores, as intensity data, each DAC value along with the corresponding phosphor set intensity level.

As another aspect of this invention, the processor processes the intensity data to generate a functional approximation thereof for constructing look-up tables defining intensity levels for each of the plurality of DAC values.

As another aspect of this invention, the system is operable for utilizing the detected luminous intensity levels for generating matrices suitable for reversibly transforming rgb intensity vectors into corresponding XYZ tristimulus values.

As another aspect of this invention, the video monitor control system is operable for accurately reproducing a color sample on the video monitor.

DETAILED DESCRIPTION OF THE PREFERRED EMBODIMENTS

Figure 1:
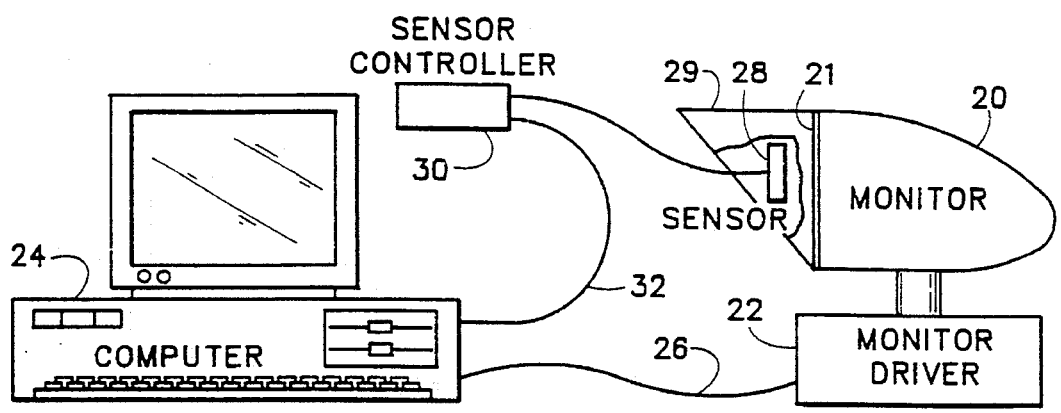
FIG. 1 is a diagram of the system of the present invention.

Referring to FIG. 1, a preferred embodiment of the present invention is employed for calibrating a video monitor 20. The monitor 20 to be calibrated may be any color CRT device. As is known, the monitor includes three electron guns, each gun corresponding to a red, green or blue phosphor set carried on the CRT screen 21.

Each electron gun delivers a beam of electrons to the screen to excite the associated phosphor set. The phosphor set glows at a luminous intensity level that corresponds to the beam current or control level of the gun. The beam is raster-scanned over the screen in response to conventional beam deflection mechanisms. The monitor 20 is driven by a display generator system or monitor driver 22. The monitor and monitor driver can be any suitable color graphics system such as a Tektronix 4125 Color Graphics Workstation. Further, although the discussion hereafter identifies a separate main computer 24, it is contemplated that all of the described functions of the computer may be carried out by the processor sets incorporated into the Color Graphics Workstation. As a result, such a workstation will have self-calibration capability. It is also pointed out that the video monitor color control system of the present invention is useful for calibrating any personal computer monitor driven with a color graphics display generator.

The monitor driver 22 receives control signals from the computer 24 via a conductor 26. The control signals, hereafter referred to as "DAC signals", are coded digital signals identifying a control level for driving a particular electron gun. The monitor driver decodes the signals and drives the gun accordingly.

The main computer 24, such as a Compaq personal computer manufactured by Compaq Computer Company, includes a processor that is programmed to generate a sequence of DAC signals, and to supply those signals to the monitor driver 22. Specifically, as mentioned above, each DAC signal sent to the monitor identifies an electron gun to be addressed by the monitor driver, and indicates the DAC value corresponding to a particular gun control level. Typically, DAC values range in integer increments from 0 to 255.

For each DAC signal, the monitor driver 22 directs the monitor 20 to produce a full screen display of the color that results when the signaled electron gun is driven at the signaled DAC value. As each distinct DAC signal is sent to the monitor, the computer 24 signals a sensor 28 to supply the computer with a number of luminous intensity level readings detected from the CRT screen. In this regard, the sensor 28 is any suitable photometer or radiometer responsive to the monitor screen luminosity to produce a representative analog electrical signal. Preferably, the monitor screen 21 is shielded 29 to eliminate ambient light effects on the sensor.

A sensor controller 30 is interconnected between the sensor 28 and the computer 24 to facilitate communication therebetween. The sensor controller includes an analog-to-digital (A/D) converter for reducing the sensor readings to representative digital signals. Further, the sensor controller includes a microprocessor such as an Intel 8751, which is programmed to supply the digital intensity signals to the main computer via a conductor 32 when signaled by the main computer. Several intensity level readings are delivered to the computer for each DAC signal. The computer averages and stores the readings.

After DAC-value/intensity data has been obtained for all three guns, the data is processed, as described more fully below, to construct a DAC-value/intensity look-up table for each gun. The look-up tables are tabulations of every single DAC value along with an associated phosphor set luminous intensity level. The look-up tables are thereafter available to convert rgb intensity vectors into the appropriate DAC values, or to convert the DAC values of a color into its rgb intensity vector.

Figure 2:
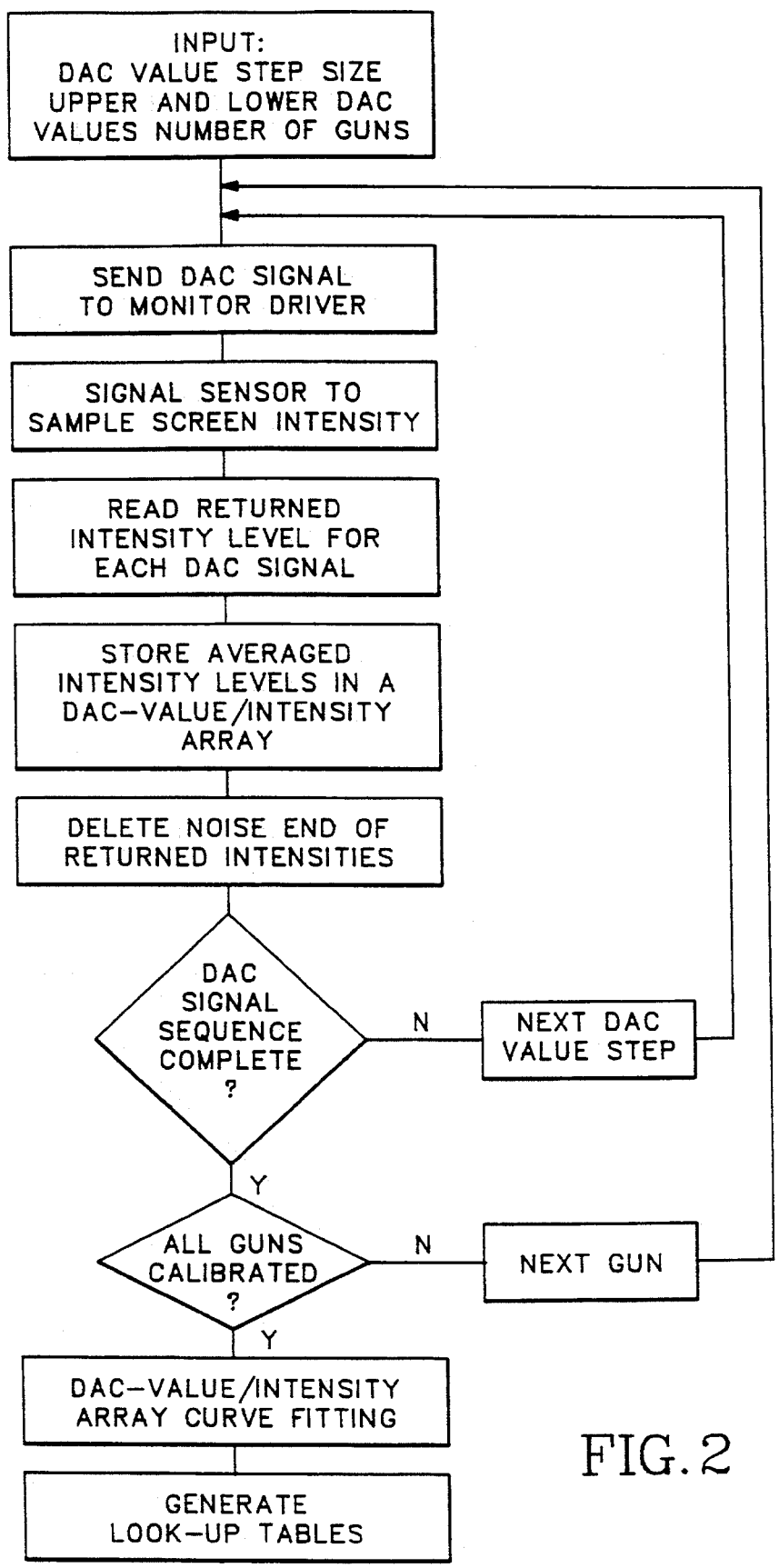
FIG. 2 is a flow chart depicting the sequence of events for calibrating a video monitor in accordance with the invention.

Turning to FIG. 2, depicted there is a flow chart corresponding to the computer program used for operating the system of FIG. 1. Specifically the computer 24 receives as input the DAC value step size, the upper and lower DAC value limits, and the number of guns. The DAC value step size indicates the increment between each DAC value sent to the monitor driver via each DAC signal. Rapid calibration is achieved if the DAC value step size is 5; however, any step size may be selected.

Lower limit and upper limit DAC value constants are also established. Specifically, the upper limit DAC value constant is established at 255. The lower limit constant is established at a value nearest to 0, which will yield an integer multiple of the DAC value step size between the upper and lower limits. For instance, for a DAC value step size of 25, the lower limit is established at 5. Establishing the lower limit as just described ensures that the intensity level for the highest DAC value, 255, will always be detected.

The number of guns input to the computer indicates whether a monochrome (1 gun) or color (3 gun) monitor is being calibrated. This discussion assumes that a color monitor is being calibrated, although monochrome monitors may be likewise calibrated.

After establishing communications files between the computer 24 and the monitor driver 22, and between the computer and the sensor controller 30, the sequence of DAC signals is sent by the computer 24 to the monitor driver 22. In the preferred embodiment, each DAC signal is transmitted in a coded form comprising ASCII characters that identify the DAC signal as a sequence of three elements respectively corresponding to the DAC values for the electron guns associated with the red, green and blue phosphors. Two of the three elements are established at DAC values equal to 0, and the remaining element is the DAC value to be applied to the associated electron gun.

After each DAC-signal is transmitted to the monitor a "sample" signal is transmitted to the sensor controller communication file. The sensor controller reads the "sample" signal and loads the communication file with a digital intensity level reading that was obtained, via the A/D converter in the sensor controller 30, from the continuously applied sensor output. The content of the communication file is read by the computer, which then signals for another reading. This sampling process is repeated for the same DAC signal until several (preferably 10) intensity level readings are obtained and averaged.

The averaged intensity readings are stored as part of an array of DAC-value/intensity levels. The computer next generates and sends to the monitor driver another DAC signal corresponding to the next DAC value step for the same gun signaled in the prior DAC signal. It is pointed out that the sequence of DAC signals may be sent in ascending or descending order of DAC values between the upper and lower DAC value limits. It has been found, however, that phosphor persistence may influence intensity readings if the monitor is driven with descending DAC value steps. Accordingly, it is preferred that the DAC signal sequence be sent to the monitor in order of ascending DAC values.

After intensity levels for all DAC values of all guns have been collected (the DAC-value/intensity data hereafter referred to as the "intensity data"), the low end of the intensity data is analyzed to delete that portion of the data wherein the intensity levels are indistinguishable from noise. That is, during manufacture and set up of each monitor, the CRT electron guns are over-biased to ensure that a zero drive voltage applied to the guns yields no phosphor glow. Thus, it is desirable to delete the low DAC values having no effect of the phosphor intensity because of the over-biasing (i.e., the DAC values "producing" only noise). To this end, the intensity levels of the two lowest DAC values are compared. If the difference in the levels does not exceed a threshold value t, the lower level is discarded and the remaining level is then compared with the next higher level. This comparison process continues for increasing DAC values until the difference between compared intensity levels exceeds the threshold t, at which point the intensity data will be free of all meaningless data.

The threshold value, t, is established as the detectable difference in the power or intensity function of the CRT corresponding to the change in DAC values (i.e., gun control levels) between each DAC signal.

The intensity data, comprising as it does a set of ordered pairs, is amenable to curve fitting techniques for providing a simple analytical expression of the DAC-value/intensity relationship. Preferably, the data is processed by the technique known as the least-squares fit method, wherein the coefficients of the polynominal function $$y = a_0 + a_1 x + a_2 x^2 + \ldots + a_m x^m \tag{1}$$

are obtained by solving the system of m+1 equations:

$$na_0 + a_1\Sigma x_i + a_2\Sigma x_i^2 + \ldots a_m\Sigma x_i^m = \Sigma y_i;$$
$$a_0\Sigma x_i + a_1\Sigma x_i^2 + a_2\Sigma x_i^3 + \ldots + a_m\Sigma x_i^{m+1} = \Sigma x_i y_i;$$
$$\ldots$$
$$a_0\Sigma x_i^m + a_1\Sigma x_i^{m+1} + a_2\Sigma x_i^{m+2} + \ldots + a_m\Sigma x_i^{2m} = \Sigma x_i^m y_i$$

It has been found that acceptable curve fitting results are obtained when the degree, m, of the polynominal is between 5 and 7.

Using the calculated coefficients of the polynominal function of equation (1), a look-up table for each electron gun is next generated and stored by the computer. Specifically, the look-up table is generated by solving the polynominal function for each single DAC value between upper limit (255) and the lower limit remaining after the noise data deletions are made. Usually, the remaining lower limit DAC value will be in the range of 25–30. It is important to note that the look-up table comprises intensity levels for every single DAC value, and not just for the DAC value steps for which the intensity data was originally collected.

It is contemplated that the look-up tables could be constructed without processing the intensity data as just described. For instance, useful look-up tables may be constructed by acquiring intensity level readings for every DAC-value (i.e., DAC value step size=1). However, greater precision is found with the data processing technique just described.

As another aspect of this invention, the system is readily adaptable to generate a matrix useful for precisely converting rgb intensity vectors into corresponding CIE tristimulus values XYZ. That matrix is hereafter referred to as the RGB-to-XYZ matrix and denoted [A]. Similarly, the system also generates a matrix known as the XYZ-to-RGB matrix for converting the XYZ tristimulus values of a color into a corresponding rgb intensity vector. The XYZ-to-RGB matrix is denoted [A$^{-1}$].

Figure 3:
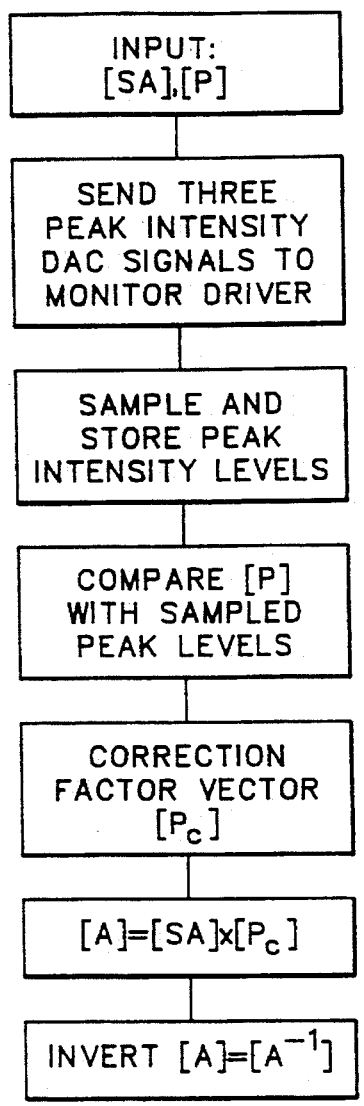
FIG. 3 is a flow chart depicting the sequence of events for generating matrices suitable for reversibly transforming rgb intensity vectors into corresponding XYZ tristimulus values.

With reference to FIGS. 1 and 3, to construct the RGB-to-XYZ matrix, the computer is supplied with two sets of data, one data set is referred to as the specified RGB-to-XYZ matrix and denoted [SA]. This data is generated through spectroradiographic analysis of the monitor at the time of manufacture. The specified RGB-to-XYZ matrix is a 3-by-3 matrix, the elements of which represent the relative intensity contributions of the red, green and blue phosphors (columns) to the XYZ tristimulus values (rows) determined when the phosphors are excited to full intensity. A useful explanation of the CIE system and the related tristimulus values XYZ is provided in "Principles of Color Technology", 2nd ed. 1981, by Billmeyer and Saltzman.

The second data set supplied to the computer is a three element vector denoted [P], the elements of which represent the peak luminous intensity level of the red, green and blue phosphors as detected at the time the specified RGB-to-XYZ matrix data was compiled.

As an important aspect of this invention, the system processes the input data in conjunction with intensity level readings to generate a corrected RGB-to-XYZ matrix, which reflects the true phosphor luminance characteristics of the monitor, as opposed to those characteristics specified by the manufacturer. In this regard, it can be appreciated that heavy use, vibrations, etc., can vary the luminous characteristics of a particular monitor relative to the specified characteristics. Accordingly, employing the system of the present invention to account for these variations yields a "corrected" RGB-to-XYZ matrix. This corrected matrix, denoted [A], is important for generating colors on the monitor that have the colorimetric parameters desired.

Corrected RGB-to-XYZ matrix construction commences with the computer 24 generating a series of three DAC signals. The first DAC signal instructs the monitor driver to drive the "red" electron gun to produce a peak intensity red phosphor glow. That is, the red electron gun is driven at the maximum DAC value, 255. After the first DAC signal is transmitted to the monitor driver, the intensity level reading is sampled from the monitor screen and stored in the computer as described earlier.

The second and third DAC signals similarly signal peak intensity blue phosphor glow and peak green phosphor glow, respectively. As above, the peak intensity level readings for these phosphors are sampled and stored. It can be appreciated that the peak intensity levels may also be obtained by reference to the look-up tables described earlier.

The sampled peak intensity levels for each phosphor is compared with (i.e., divided into) its counterpart of the specified vector [P]. This comparison yields a correction factor vector [P$_c$], the three elements of which represent, in decimal form, the variation of each actual phosphor peak intensity level from that specified. Accordingly, when the specified RGB-to-XYZ matrix is multiplied by the correction factor vector [P$_c$], the corrected RGB-to-XYZ matrix is formed.

As noted earlier, the corrected RGB-to-XYZ matrix is useful for transforming an rgb intensity vector into its corresponding XYZ tristimulus values.

The corrected RGB-to-XYZ matrix is next inverted to yield the 3-by-3 XYZ-to-RGB matrix, [A$^{-1}$]. As noted earlier, the XYZ-to-RGB matrix is useful for transforming the tristimulus values of a color into its corresponding rgb intensity vector for the CRT.

Figure 4:
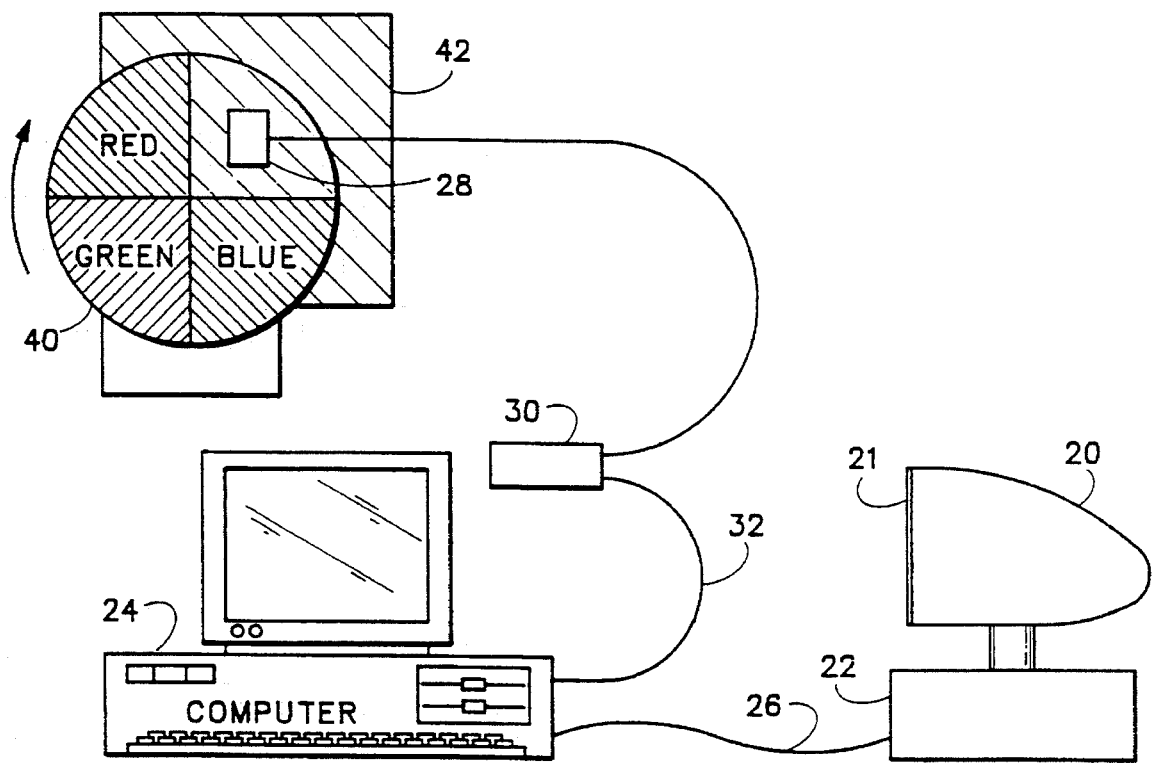
FIG. 4 is a diagram of an alternative embodiment of the system useful for detecting colorimetric data from a color sample and for accurately duplicating the color on a video monitor.
Figure 5:
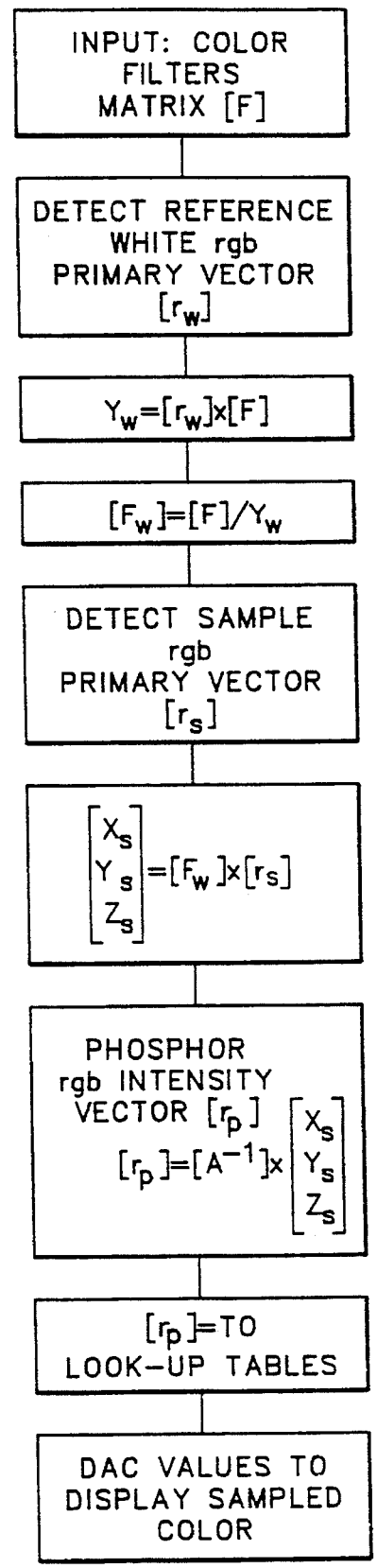
FIG. 5 is a flow chart depicting the sequence of events for detecting colorimetric data from a color sample and for duplicating the color on a video monitor.

As another aspect of this invention, the video monitor color control system is readily adaptable for accurately reproducing a color sample on a video monitor. With reference to FIGS. 4 and 5, and as described in more detail below, the sensor 28 and a color filter wheel 40 are employed to detect the luminous characteristics of a uniform color sample 42. These characteristics are transformed, using an XYZ-to-RGB matrix, into an rgb intensity vector for the video monitor. The rgb intensity vector is converted via the above-described look-up tables into the corresponding DAC values and the sampled color is displayed on the monitor screen 21.

Turning to the particulars of the color duplication process just outlined, the color wheel 40 is used to provide the sensor 28 with the luminance levels of the red, green and blue light that is reflected from the color sample 42. The light passing through the red, green and blue filters will hereafter be referred to as the red, green and blue primaries. The color wheel is a circular arrangement of three color filters and one clear space. The color wheel is selectively rotatable by known means. It is contemplated that other mechanisms for interchanging color filters may be substituted for the color wheel.

The color wheel 40 is analyzed with conventional spectrophotometric means to establish the colorimetric properties of each filter. In this regard, the red, green and blue filters are each illuminated by a standard CIE illuminant and the primary light transmitted therethrough is analyzed to determine the relative contribution of each primary to the CIE XYZ tristimulus values of the illuminant. This data is assembled into a color filters matrix denoted [F]. The color filters matrix is a 3-by-3 matrix with elements representing the relative intensity contributions of the red, green and blue primaries (columns) to the XYZ values (rows) of the illuminant.

Preferably, the color filters matrix is normalized so that the Y tristimulus value of the illuminant will equal 1. As noted in the referenced patent application by Murch, et al., this normalization is useful for correlating the Y tristimulus value with a color parameter of the CIE system known as the metric lightness function. The metric lightness function is a useful means of describing the lightness of a color.

The color filters matrix data is next processed to account for differences between the illuminant used to establish the matrix and the "reference white" light, which is the light used for illuminating the color sample. To this end, a white reflecting surface, such as white paper, is positioned between the color sample 42 and the color wheel 40. The reference light reflected from the paper passes through the red, green and blue filters of the rotating color wheel 40. The computer 24 instructs the sensor controller 30 to provide luminance intensity level readings for each of the red, green and blue primaries passing through the filters. These readings are arranged in a reference white rgb primary vector, $[r_w]$, the three elements of which represent the relative red, green and blue primary luminance contributions of the reference white.

The rgb primary vector $[r_w]$ for the reference white is next multiplied by the Y row of the color filter matrix $[F]$ to yield the Y tristimulus value corresponding to the reference white, $Y_w$, or $$Y_w = [r_w] \times [F]$$

All of the elements of the color filters matrix $[F]$ are divided by the reference white tristimulus value $Y_w$ to yield a new color filters matrix $[F_w]$ which is weighted for the reference white light under which the color sample is detected.

With the weighted color filter matrix $[F_w]$ constructed as just described, the luminance characteristics of the color sample 42 are detected for reproduction of the color on the monitor screen. More particularly, the color wheel is positioned between the color sample 42 and the sensor 28. The computer 24 is controlled to collect, via the sensor controller 30, luminance intensity levels for the red, green and blue primaries as the color wheel is rotated. The sampled intensity level data is arranged into a sample rgb primary intensity vector, denoted $[r_s]$. The three elements of the sample rgb primary vector represent the relative luminance contributions of the primaries of the sampled color.

The sample rgb primary intensity vector is next multiplied with the weighted color filter matrix $[F_w]$ to yield the tristimulus values $X_s$, $Y_s$, $Z_s$ for the sampled color.

The tristimulus values $X_s$, $Y_s$, $Z_s$ for the sampled color are next multiplied by the XYZ-to-RGB matrix $[A^{-1}]$, described above, to yield for the sampled color the corresponding rgb intensity vector in terms of the rgb phosphors (hereafter referred to as the phosphor rgb intensity vector).

The phosphor rgb intensity vector is compared with the above-described look-up tables earlier to yield the three DAC values for each gun that correspond to the phosphor rgb intensity vector of the sample color. Driving the electron guns with these DAC values produces on the video monitor a color that duplicates, in colorimetric terms, the sample color.

While preferred embodiments of the invention have been illustrated and described, it will be appreciated that various changes can be made therein without departing from the spirit and scope of the invention as defined in the claims.

I claim:

1. A method of periodically calibrating a cathode-ray tube display (CRT) to establish a stored relationship between a set of RGB signal values and associated CRT intensity values such that perceptually accurate colors are displayed on the CRT in response to color input signal values, comprising the steps of:

driving the CRT with an initial RGB signal value that displays a predetermined color on the CRT;

storing in a memory an initial CRT intensity value associated with the initial RGB signal value and the corresponding predetermined color displayed on the CRT;

subjecting the CRT display to a period of use likely to cause a change in the predetermined color displayed in response to the initial RGB signal value;

stepping the RGB signal values through a group of values;

storing in a lookup table a sensed current CRT intensity value associated with each stepped RGB signal value;

finding in the lookup table a current CRT intensity value associated with the initial RGB signal value;

comparing the current CRT intensity value with the initial CRT intensity value, and generating a correction factor;

receiving a color input signal value;

altering the color input signal with the correction factor to generate a corrected RGB signal value; and driving the CRT with the corrected RGB signal value to display on the CRT a perceptually accurate color in response to the received color input signal value.

2. The method of claim 1 in which the stepping step and the storing in a lookup table step further comprise:

shielding from ambient light a sensed portion of the CRT;

stepping the RGB signal values repeatedly through the group of values; and storing in the lookup table an average of the sensed CRT intensity values associated with each repeatedly stepped RGB signal value.

3. The method of claim 1 further including a step of deleting from the lookup table RGB signal values for which an associated sensed CRT intensity value is substantially zero.

4. The method of claim 1 further including a step of adding to the lookup table computed non-zero CRT intensity values corresponding to any RGB signal values missing from the group of stepped RGB signal values.

5. The method of claim 3 in which the added CRT intensity values are computed by using a polynomial-based curve fitting calculation.

6. The method of claim 1 in which the storing in a memory step further includes measuring and storing in an ¦SA¦ matrix a set of CRT color data representing a relationship between the RGB signal values driving the CRT and a set of device independent color values, 7. The method of claim 6 further including the steps of:

multiplying the ¦SA¦ matrix by the correction factor to generate a corrected matrix ¦A¦ relating device independent color values to associated CRT intensity values;

receiving a particular device independent color value signal;

dividing the particular device independent color value signal by ¦A¦ to generate a particular CRT intensity value;

finding in the lookup table the particular RGB signal value corresponding to the particular CRT intensity value; and driving the CRT with the particular RGB signal value to display on the CRT a colorimetrically accurate color in response to the particular received device independent color value signal.

8. The method of claim 7 in which the device independent color values are CIE tri-stimulus XYZ values.

9. A method of periodically calibrating a cathode-ray tube display (CRT) to establish a stored relationship between a set of RGB signal values and associated CRT intensity values such that perceptually accurate colors are displayed on the CRT in response to CIE tri-stimulus XYZ color input signal values, comprising the steps of:

storing a set of measured CRT color data in an |SA| matrix representing a relationship between the RGB signal values driving the CRT and a set of CIE tri-stimulus color values;

setting the RGB signals to a maximum value to display a standardized white on the CRT;

storing a measured peak intensity vector |P| relating the RGB maximum signal values to a set of corresponding CRT intensity values of the standardized white displayed on the CRT;

subjecting the CRT display to a period of use likely to cause a measurable change in the standardized white displayed in response to the maximum RGB signal values;

following the period of use, stepping the RGB signal values through a group of values substantially spanning from a zero RGB signal value to the maximum RGB signal values;

storing in the lookup table a sensed CRT intensity value corresponding to each stepped RGB signal value;

finding in the lookup table a set of maximum CRT intensity values associated with the maximum RGB signal values;

comparing the maximum CRT intensity values with the peak intensity vector |P|, and generating a correction factor intensity vector |Pc|;

multiplying the |SA| matrix by the correction factor intensity vector |Pc| to generate a corrected matrix |A| relating CIE tri-stimulus XYZ color values to associated CRT intensity values;

receiving a CIE tri-stimulus XYZ color value signal;

dividing the XYZ color value signal by |A| to generate a corresponding CRT intensity value;

finding in the lookup table the RGB signal value corresponding to the CRT intensity value; and driving the CRT with the corresponding RGB signal value to display on the CRT the perceptually accurate color in response to the received CIE tri-stimulus XYZ color value signal.

10. The method of claim 9 further comprising the steps of:

deleting from the lookup table each RGB signal value for which an associated sensed CRT intensity value is substantially zero; and inserting in the lookup table CRT intensity values corresponding to any RGB signal values not deleted or in the group of stepped RGB signal values.

11. The method of claim 10 in which the inserted CRT intensity values are determined by using a polynomial-based curve fitting calculation.

12. Apparatus for periodically calibrating a cathode-ray tube display (CRT) to establish a stored relationship between a set of RGB signal values and associated CRT intensity values such that perceptually accurate colors are displayed on the CRT in response to color input signal values, comprising:

a CRT driver causing the CRT to display light intensity levels in response to RGB signal values, a processor generating an initial RGB signal value for displaying a predetermined color on the CRT, and a memory storing a lookup table and a measured phosphor intensity vector associated with the initial RGB signal value;

the processor generating a group of RGB signal values such that a corresponding group of CRT intensity levels is displayed on the CRT; and a sensor generating a phosphor intensity vector for each light intensity level sensed on the CRT, the processor storing in the lookup table the phosphor intensity vector associated with each of the group of RGB signal values, finding in the lookup table a current phosphor intensity vector associated with the initial RGB signal value, comparing the current CRT intensity vector with the initial CRT intensity vector to generate a correction factor vector, and altering the color input signal values with the correction factor to generate corrected RGB signal values that are sent to the CRT driver for displaying perceptually accurate colors on the CRT in response to the color input signal values.

13. The apparatus of claim 12 further comprising: a light shield to prevent ambient light from affecting CRT light intensity level values sensed by the sensor.

14. The apparatus of claim 12 in which the memory includes an |SA| matrix that represents an initially measured relationship between the RGB signal values driving the CRT and a set of device independent color values.

15. The apparatus of claim 14 further comprising:

a color corrector in which the processor multiplies the |SA| matrix by the correction factor to generate a corrected |A| matrix that relates device independent color values to associated CRT intensity values, divides a particular device independent color value by |A| to generate a particular CRT intensity value, locates in the lookup table a particular RGB signal value corresponding to the particular CRT intensity value, and sends to the CRT driver the particular RGB signal value, thereby displaying on the CRT a colorimetrically accurate color in response to the particular device independent color value.

16. The method of claim 15 in which the device independent color value is a CIE tri-stimulus XYZ value.

17. Apparatus for periodically calibrating a cathode-ray tube display (CRT) to establish a stored relationship between a set of RGB signal values and associated CRT intensity values such that colorimetrically accurate colors are displayed on the CRT in response to CIE tri-stimulus XYZ color input signal values, comprising:

a CRT driver causing the CRT to display light intensity levels in response to the RGB signal values, a processor generating a maximum RGB signal value for displaying an initial white color on the CRT, and a memory storing a lookup table, a CRT phosphor intensity vector associated with the initial white color, and an |SA| matrix representing an initially measured relationship between the RGB signal values driving the CRT and a set of CIE tri-stimulus XYZ color values;

the processor generating a group of RGB signal values such that a corresponding group of CRT intensity levels is displayed on the CRT; and a sensor generating a phosphor intensity vector in response to each light intensity level sensed on the CRT, and the processor storing in the lookup table a phosphor intensity vector associated with each value in the group of RGB signal values and inserting computed phosphor intensity vectors associated with any RGB signal values not in the group of RGB signal values, finding in the lookup table a current phosphor intensity vector associated with the maximum RGB signal value, comparing the current CRT intensity vector with the intensity vector associated with the initial white color and generating a correction factor vector, multiplying the |SA| matrix by the correction factor to generate a corrected |A| matrix relating the CIE tri-stimulus XYZ color values to associated CRT intensity values, dividing a particular device independent color value by |A| to generate a particular CRT intensity value, locating in the lookup table a particular RGB signal value corresponding to the particular CRT intensity value, and sending to the CRT driver the particular RGB signal value, thereby displaying on the CRT a colorimetrically accurate color associated with the particular CIE tri-stimulus XYZ color value.

* * * * *